(12) United States Patent
Ko et al.

(10) Patent No.: US 8,457,235 B2
(45) Date of Patent: Jun. 4, 2013

(54) METHOD OF TRANSMITTING FEEDBACK DATA IN MULTIPLE ANTENNA SYSTEM

(75) Inventors: Hyun Soo Ko, Seoul (KR); Bin Chul Ihm, Seoul (KR); Jin Young Chun, Seoul (KR); Wook Bong Lee, Seoul (KR); Jae Hoon Chung, Seoul (KR); Sung Ho Park, Seoul (KR); Jin Hyuk Jung, Seoul (KR); Moon Il Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 551 days.

(21) Appl. No.: 12/666,612

(22) PCT Filed: Jun. 25, 2008

(86) PCT No.: PCT/KR2008/003627
§ 371 (c)(1),
(2), (4) Date: Dec. 23, 2009

(87) PCT Pub. No.: WO2009/002087
PCT Pub. Date: Dec. 31, 2008

(65) Prior Publication Data
US 2010/0183086 A1      Jul. 22, 2010

Related U.S. Application Data

(60) Provisional application No. 60/946,130, filed on Jun. 25, 2007, provisional application No. 60/978,140, filed on Oct. 8, 2007, provisional application No. 61/025,304, filed on Feb. 1, 2008.

(30) Foreign Application Priority Data

Aug. 14, 2007   (KR) .................. 10-2007-0081913
Nov. 19, 2007   (KR) .................. 10-2007-0118166
Jun. 13, 2008   (KR) .................. 10-2008-0056002

(51) Int. Cl.
*H04B 7/02* (2006.01)
*H04B 7/00* (2006.01)

(52) U.S. Cl.
USPC .............................. 375/267; 455/513; 455/69

(58) Field of Classification Search
USPC ................. 375/260, 267, 299, 347; 370/334, 370/337, 344, 347; 455/24, 509, 513, 68, 455/69, 70
See application file for complete search history.

(56) References Cited

U.S. PATENT DOCUMENTS 6,615,382 B1   9/2003   Kang et al.
8,036,131 B2  10/2011   Roh et al.

(Continued)

FOREIGN PATENT DOCUMENTS

EP      1569403     8/2005
EP      1750399     2/2007

(Continued)

OTHER PUBLICATIONS

LG Electronics, "CQI overhead reduction for MIMO in frequency domain", R1-071545, 3GPP TSG RAN WG1 #48bis, Mar. 2007.

(Continued)

*Primary Examiner* — Young T. Tse
(74) *Attorney, Agent, or Firm* — Lee, Hong, Degerman, Kang & Waimey

(57) ABSTRACT

A method of transmitting feedback data in a multiple antenna system includes generating feedback data based on the channel information and transmitting the feedback data at transmission periods, wherein the feedback data is transmitted in a plurality of report types respectively having a different control signal type contained depending on the transmission periods.

7 Claims, 8 Drawing Sheets

U.S. PATENT DOCUMENTS

| | | | |
|---|---|---|---|
| 2002/0018530 A1* | 2/2002 | Kim et al. | 375/267 |
| 2003/0148738 A1* | 8/2003 | Das et al. | 455/67.5 |
| 2004/0165676 A1 | 8/2004 | Krishnan et al. | |
| 2005/0201474 A1 | 9/2005 | Cho et al. | |
| 2006/0146760 A1 | 7/2006 | Khandekar et al. | |
| 2006/0176803 A1 | 8/2006 | Oh et al. | |
| 2007/0097856 A1 | 5/2007 | Wang et al. | |
| 2008/0043677 A1* | 2/2008 | Kim et al. | 370/332 |
| 2008/0176575 A1 | 7/2008 | Sutton | |
| 2008/0232449 A1* | 9/2008 | Khan et al. | 375/220 |
| 2008/0233902 A1 | 9/2008 | Pan et al. | |
| 2008/0268785 A1* | 10/2008 | McCoy et al. | 455/67.11 |
| 2008/0268862 A1 | 10/2008 | Kent et al. | |
| 2008/0303699 A1 | 12/2008 | Zhang et al. | |
| 2009/0034636 A1 | 2/2009 | Kotecha et al. | |
| 2009/0052405 A1 | 2/2009 | Ko et al. | |
| 2009/0115649 A1* | 5/2009 | Wu | 341/106 |
| 2010/0085912 A1* | 4/2010 | Chun et al. | 370/328 |
| 2010/0113057 A1* | 5/2010 | Englund et al. | 455/452.1 |

FOREIGN PATENT DOCUMENTS

| | | |
|---|---|---|
| EP | 1780925 | 5/2007 |
| JP | 2009-004921 | 1/2009 |
| WO | 2006051372 | 5/2006 |
| WO | 2006071052 | 7/2006 |
| WO | 2006130866 | 12/2006 |
| WO | 2007052941 | 5/2007 |
| WO | 2008/137430 | 11/2008 |

OTHER PUBLICATIONS

LG Electronics, "Frequency granularity of CQI and PMI feedback", R1-073491, 3GPP TSG RAN WG1 #50, Aug. 2007.

LG Electronics, "Investigation on tradeoff between PMI overhead and performance", R1-074215, 3GPP TSG RAN WG1 Meeting #50bis, Oct. 2007.

Huawei, "Downlink Adaptation/Scheduling Guided by an Efficient CQI-Feedback Scheme,"R1-060821, TSG RAN WG1 Meeting 44bis, Mar. 2006, XP-050101734.

Huawei, "Baseline Uplink E-CQI Message—Content and Size," R1-063036, TSG RAN WG1 RAN1 Meeting #47, Nov. 2006, XP-050103503.

Huawei, "Overhead Reduction of UL CQI Signalling for E-UTRA DL," R1-061819, 3GPP TSG RAN LTE Ad Hoc, Jun. 2006, XP-050111636.

Motorola, "PMI Downlink Signaling and Downlink PDCCH Format", R1-073077, 3GPP TSG RAN1#49bis, Jun. 2007.

Samsung, "Uplink data-non-associated control signaling", R1-071573, 3GPP TSG RAN WG1 Meeting #48bis, Mar. 2007.

Huawei, "Unified uplink CQI signaling by efficient labeling", R1-061246, TSG RAB WG1 meeting 45, May 2006.

Rohde, et al., "UMTS Long Term Evolution (LTE) Technology Introduction", Application Note 1MA111, Mar. 2007.

Ericsson, "Multiple CQI formats", R1-073055, TSG-RAN WG1 #49bis, Jun. 2007.

Samsung, "LTE uplink CQI report format", R1-073107, 3GPP TSG RAN WG1 Meeting #49-bis, Jun. 2007.

Samsung, "CQI report transmission using PUSCH resource", R1-073118, 3GPP TSG RAN WG1 Meeting #49bis, Jun. 2007.

Huawei, "DL control signaling to support MIMO", R1-072905, 3GPP TSG RAN WG1 #49bis, Jun. 2007.

Huawei, "DL Control Signaling of MIMO PMI Information for SU-MIMO", 3GPP TSG RAN WG1 #49, R1-072318, May 2007, 6 pages.

Texas Instruments, et al., "Proposed Way Forward on Codebook Design for E-UTRA", 3GPP TSG RAN WG1 48. R1-070728, Feb. 2007, 6 pages.

Texas Instruments, "Further Details on Codebook-Based Pre-coding for E-UTRA", 3GPP TSG RAN WG1 47bis, R1-070270, Jan. 2007, 6 pages.

In the Japanese Patent Office Application Serial No. 2010-512093, Office Action dated Nov. 6, 2012, 3 pages.

In the USPTO U.S. Appl. No. 13/169,800, Notice of Allowance dated Nov. 21, 2012, 11 pages.

Samsung, "Design of PDCCH format in support of MIMO," R1-073110, 3GPP TSG RAN WG1 Meeting #49-bis, Jun. 2007, 3 pages.

Japan Patent Office Application Serial No. 2010-512093, Office Action dated Mar. 4, 2013, 3 pages.

* cited by examiner

METHOD OF TRANSMITTING FEEDBACK DATA IN MULTIPLE ANTENNA SYSTEM

CROSS-REFERENCE TO RELATED APPLICATIONS

This application is the National Stage filing under 35 U.S.C. §371 of International Application No. PCT/KR2008/003627, filed on Jun. 25, 2008, which claims the benefit of earlier filing date and right of priority to Korean Application Nos. 10-2007-0081913, filed on Aug. 14, 2007, 10-2007-0118166, filed on Nov. 19, 2007, and 10-2008-0056002, filed on Jun. 13, 2008, and also claims the benefit of U.S. Provisional Application Ser. Nos. 60/946,130, filed on Jun. 25, 2007, 60/978,140, filed on Oct. 8, 2007, and 61/025,304, filed on Feb. 1, 2008.

TECHNICAL FIELD

The present invention relates to wireless communication, and more specifically, to a method for transmitting feedback data in a wireless communication system.

BACKGROUND ART

Wireless communication systems are widely used to provide various types of communications. For example, voices and/or data are provided by the wireless communication systems. General wireless communication systems provide multiple users with one or more shared resources. For example, the wireless communication systems may use a variety of multiple access techniques such as Code Division Multiple Access (CDMA), Time Division Multiple Access (TDMA), and Frequency Division Multiple Access (FDMA).

Orthogonal Frequency Division Multiplexing (OFDM) uses a plurality of orthogonal subcarriers. OFDM uses the characteristic of orthogonality between an Inverse Fast Fourier Transform (IFFT) and a Fast Fourier Transform (FFT). A transmitter transmits data after performing IFFT. A receiver restores original data by performing FFT on a received signal. The transmitter uses IFFT to combine multiple subcarriers, and the receiver uses corresponding FFT to separate the multiple subcarriers. According to OFDM, complexity of the receiver may be lowered in a frequency selective fading environment of wideband channels, and spectral efficiency may be enhanced through selective scheduling or the like in a frequency domain by utilizing different channel characteristics of subcarriers. Orthogonal Frequency Division Multiple Access (OFDMA) is a multiple access scheme based on OFDM. According to OFDMA, efficiency of radio resources may be enhanced by assigning different subcarriers to multiple users.

Recently, Multiple Input Multiple Output (MIMO) systems are spotlighted in order to maximize performance and communication capacity of wireless communication systems. The MIMO technique is a method that can improve transmission efficiency of transmit/receive data by employing multiple transmission antennas and multiple receive antennas, getting out of using one transmission antenna and one receive antenna used up to the present. A MIMO system is also referred to as a multiple antenna system. The MIMO technique does not depend on a single antenna path in order to receive one whole message, but applies a technique that gathers fragmented data segments received through a plurality of antennas and completes a message. As a result, data rate may be improved within a specific range, or a system range may be increased for a specific data rate.

Hereinafter, downlink means transmission from a base station (BS) to a user equipment (UE), and uplink means transmission from the UE to the BS.

Generally, the BS schedules radio resources of uplink and downlink in a wireless communication system. Feedback data are used to scheduling downlink radio resources in a multiple antenna system. The UE measures downlink channel and report the feedback data to the BS. The feedback data include a channel quality indicator (CQI), a rank indicator (RI) and a precoding matrix indicator (PMI). The CQI represents downlink channel condition, the RI corresponds to the number of useful transmission layers (or codewords) and the PMI denotes the index of a precoding matrix selected from a codebook. The UE transmits the feedback data to the BS, and the BS schedules downlink radio resources based on the feedback data.

In the multiple antenna system, the amount of the feedback data may be huge. Assuming that there are 10 subbands and 5 bit CQI for each subband is fed back, radio resources for total 50 bit is needed. Considering the PMI and the RI, more radio resources for the feedback data is needed. Furthermore, in rapidly changing channel environments, feedback data needs to be further frequently transmitted. Frequent transmission of the feedback data under limited radio resources may cause much overhead.

A method for reducing overhead due to transmission of the feedback data is required.

DISCLOSURE OF INVENTION

Technical Problem

The present invention provides a method of transmitting feedback data which can reduce overhead incurred by control signals in a multiple antenna system.

Technical Solution

In an aspect, a method of transmitting feedback data in a multiple antenna system is provided. The method includes generating feedback data based on the channel information and transmitting the feedback data at transmission periods, wherein the feedback data is transmitted in a plurality of report types respectively having a different control signal type contained depending on the transmission periods.

A whole band can be divided into a plurality of subbands and M (M≧1) subbands can be selected from the plurality of subbands. The feedback data can includes at least one of a best band channel quality indicator (CQI) over the M selected subbands or a frequency selective precoding matrix indicator (PMI) over the M selected subbands. The feedback data can further include a rank indicator (RI) which corresponds to the number of useful transmission layers and a bitmap which represents the positions of the M selected subbands.

In another aspect, a method of transmitting feedback data in a multiple antenna system is provided. The method includes transmitting first feedback data at a first transmission period on a physical uplink control channel (PUCCH) and transmitting second feedback data at a second transmission period on the PUCCH.

Advantageous Effects

Feedback data is efficiently configured and transmitted, and thus overhead caused by transmission of control signals may be reduced.

MODE FOR THE INVENTION

Figure 1:
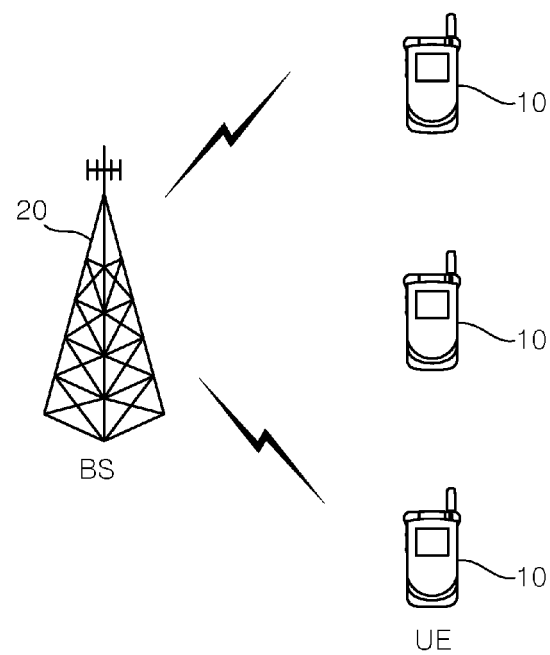
FIG. 1 shows a wireless communication system.

FIG. 1 shows a wireless communication system. Wireless communication systems are widely deployed to provide a variety of communication services such as voices, packet data, and the like.

Referring to FIG. 1, a wireless communication system comprises user equipments (UEs) 10 and a base station (BS) 20. A UE 10 can be fixed or mobile and referred to as another terminology, such as a mobile station (MS), a user terminal (UT), a subscriber station (SS), a wireless device, or the like. Generally, the BS 20 is a fixed station communicating with the UE 10, which can be referred to as another terminology, such as a node-B, base transceiver system (BTS), access point, or the like. There are one or more cells within the coverage of a BS 20.

Any multiple access technique may be applied to the wireless communication system. A variety of multiple access techniques such as CDMA (Code Division Multiple Access), TDMA (Time Division Multiple Access), FDMA (Frequency Division Multiple Access), and OFDMA (Orthogonal Frequency Division Multiple Access) may be used. For clear explanation, a wireless communication system based on OFDMA will be described hereinafter.

A wireless communication system may be a multiple antenna system. The multiple antenna system may be a MIMO (Multiple Input Multiple Output) system. Or, the multiple antenna system may be a MISO (Multiple Input Single Output) system, a SISO (Single Input Single Output) system, or a SIMO (Single Input Multiple Output) system. The MIMO system uses a plurality of transmit antennas and receive antennas. The MISO system uses a plurality of transmit antennas and a single receive antenna. The SISO system uses a single transmit antenna and a single receive antenna. The SIMO system uses a single transmit antenna and a plurality of receive antennas.

Figure 2:
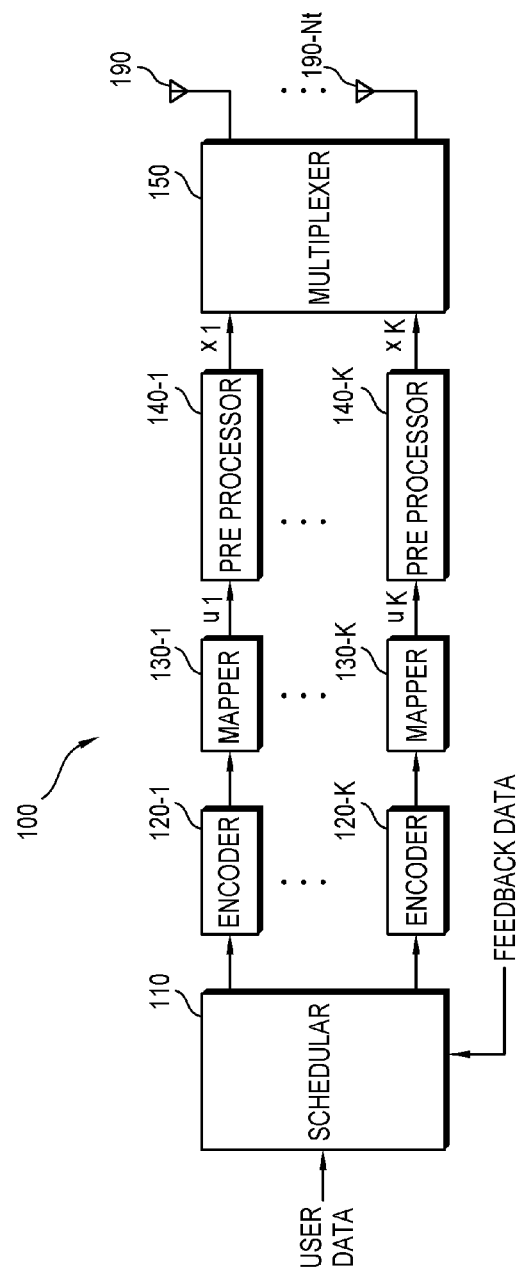
FIG. 2 shows a transmitter having multiple antennas.

FIG. 2 shows a transmitter having a multiple antenna.

Referring to FIG. 2, a transmitter 100 comprises a scheduler 110, channel encoders 120-1 to 120-K, mappers 130-1 to 130-K, preprocessors 140-1 to 140-K, and a multiplexer 150. The transmitter 100 also comprises Nt (Nt>1) transmit antennas 190-1 to 190-Nt. The transmitter 100 may be a part of the BS in downlink, and the transmitter 100 may be a part of the UE in uplink.

The scheduler 110 receives data from N users and outputs K streams to be transmitted at a time. The scheduler 110 determined users and data rates to be transmitted through available radio resources using channel information of each user. The scheduler 110 extracts the channel information from feedback data and selects modulation and coding scheme (MCS).

The channel information may be any form of a channel state information (CSI), a channel quality indicator (CQI) and the like. The CSI may represent a channel matrix, a channel correlation matrix, a quantized channel matrix, or a quantized channel correlation matrix and the like. The CQI may represent at least one of signal-to-noise ratio (SNR), signal-to-interference plus noise ratio (SINR) and MCS level.

Available radio resources assigned by the scheduler are radio resources that are used for transmitting data in a wireless communication system. For example, time slots are resources in a TDMA system, codes and time slots are resources in a CDMA system, and subcarriers and time slots are resources in an OFDMA system. In order to avoid interference with other users within the same cell or sector, each resource may orthogonally defined in a time, code, or frequency domain.

Each of the channel encoders 120-1 to 120-K encodes an input stream in a predetermined coding scheme and forms coded data. Each of the mappers 130-1 to 130-K maps the coded data to a symbol representing a location on a signal constellation. The symbol is referred to as information symbol. Any kind of modulation scheme can be used, comprising m-PSK (m-Phase Shift Keying) and m-QAM (m-Quadrature Amplitude Modulation). For example, the m-PSK may be BPSK, QPSK, or 8-PSK. The m-QAM may be 16-QAM, 64-QAM, or 256-QAM.

The preprocessors 140-1 to 140-K perform precoding on inputted information symbols $u_1, \ldots, u_k$ and generate input symbols $x_1, \ldots, x_k$. The precoding is a technique for performing preprocessing on the information symbols to be transmitted, and the precoding technique comprises RBF (Random Beamforming), ZFBF (Zero Forcing Beamforming), and the like for creating input symbols by applying a weight vector, a precoding matrix, or the like to the information symbols.

The multiplexer 150 assigns the input symbols $x_1, \ldots, x_k$ to appropriate subcarriers and multiplexes the symbols according to a user. The multiplexed symbols are modulated and transmitted through the transmit antennas 190-1 to 190-Nt.

Figure 3:
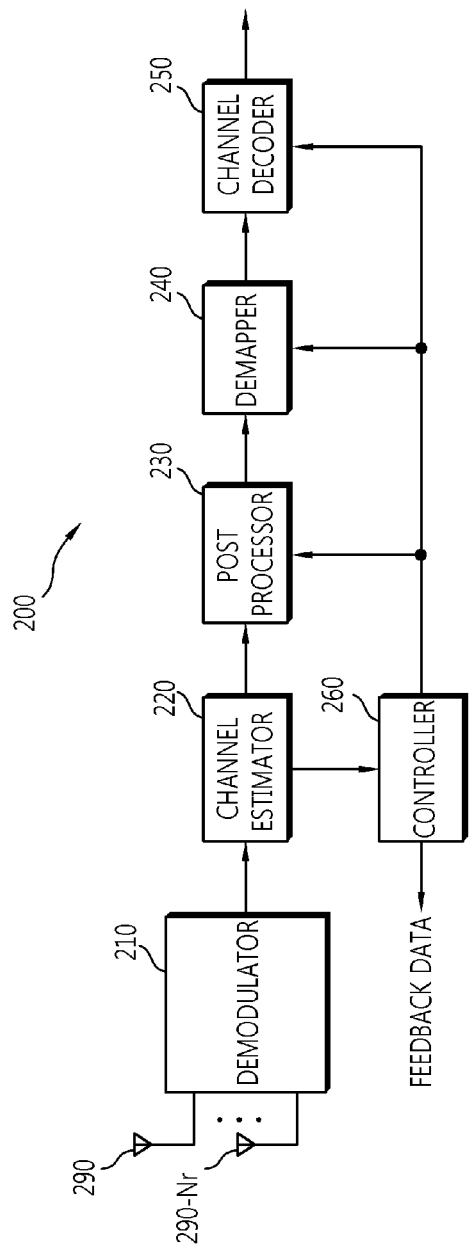
FIG. 3 shows a receiver having multiple antennas.

FIG. 3 is a block diagram showing a receiver having a multiple antenna.

Referring to FIG. 3, a receiver 200 comprises a demodulator 210, a channel estimator 220, a post-processor 230, a demapper 240, a channel decoder 250, and a controller 260. The receiver 200 also comprises Nr (Nr>1) transmit antennas 290-1 to 290-Nr. The receiver 200 may be a part of the UE in downlink, and the receiver 200 may be a part of the BS in uplink.

Signals received through the receive antennas 290-1 to 290-Nr are demodulated by the demodulator 210. The channel estimator 220 estimates a channel, and the post-processor 230 performs post-processing corresponding to the preprocessors 140-1 to 140-K. The demapper performs demapping input symbols to coded data, and the channel decoder 250 decodes the coded data and restores original data. The controller 260 feeds back feedback data including CQI, PMI and RI.

Hereinafter, granularity of the CQI/PMI/RI in a wireless communication system will be described.

Figure 4:
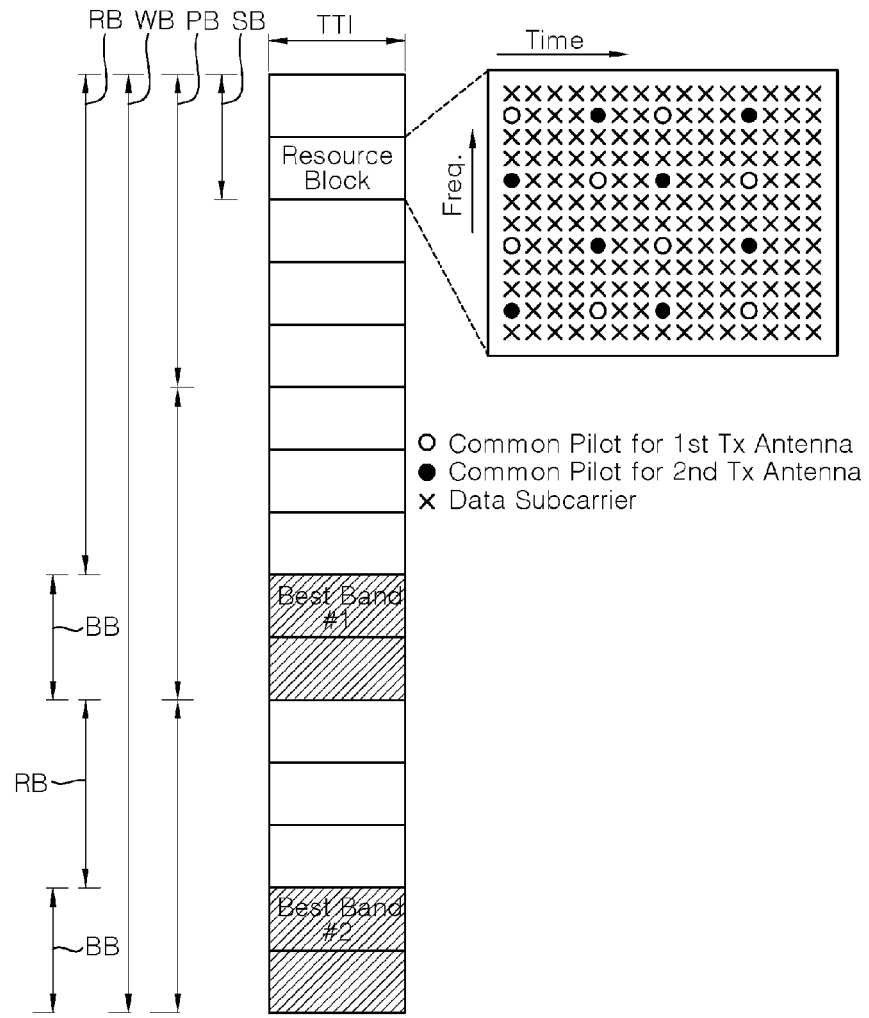
FIG. 4 shows granularity of control signals for radio resource allocation according to an embodiment of the present invention.

FIG. 4 shows granularity of control signals for radio resource allocation according to an embodiment of the present invention.

Referring to FIG. 4, user data and control signals are transmitted in a frame. The frame may comprise a plurality of OFDMA symbols in the time domain and a plurality of resource blocks in the frequency domain. A resource block is a basic unit of radio resource allocation and comprises a plurality of contiguous subcarriers. A transmission time interval (TTI) is a time interval needed to transmit one frame.

A frame may be divided into a variety of granularities such as a whole band (WB), a PMI band (PB) and a subband (SB). The SB may include at least one resource block. The PB may include one or more adjacent subbands. The WB represents all SBs corresponding to system bandwidth. Comparing the sizes of these bands, it may be that SB<=PB<=WB.

A best band (BB) indicates at least one subbands selected from the whole band. A residual band (RB) indicates remained subbands after excluding the best band from the whole band. For example, if it is assumed that CQI is transmitted in a Best-M method (M=2), the CQI is calculated for each subband, and two subbands having the largest CQI values among CQIs of respective subbands are selected. The selected two subbands become the best bands, and the other subbands become the residual bands. CQIs for the each of two best bands are reported. A CQI for the whole band or a CQI for the residual bands may be reported. Or, A CQI of the two best bands can be reported.

The whole frequency band is divided into a variety of granularities in order to reduce overhead caused by transmitting feedback data. For example, it is effective to obtain and transmit a CQI for each subband to provide a service of further superior QoS (Quality of Service). However, if CQIs of all subbands are transmitted, the overhead increases. Therefore, several subbands having a high CQI value are selected as best bands, and the CQI of the best bands is transmitted. Since the PMI affects QoS of a wireless communication system less than the CQI does, it is effective to obtain and transmit a PMI for each PMI band that has larger granularity than the subband. A rank indicator (RI) represents an independent channel that can be multiplexed by multiple antennas, and it is sufficient to obtain and transmit by the unit of the whole band. It is possible to obtain and transmit an average value of CQIs or PMIs for the whole band. Or, the size of a subband is extended, and a CQI of each subband may be transmitted. At this point, PMI band may have the same size or larger size as the subband.

The configuration of the frame and the bands of a variety of granularities comprised in the frame as described above are merely an example, and the size and number of respective bands may be variously modified and applied.

Figure 5:
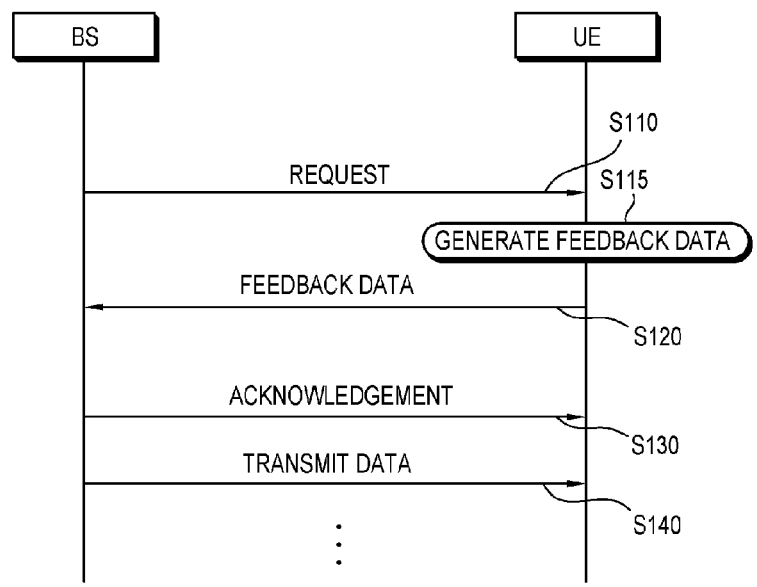
FIG. 5 is a flowchart illustrating a data transmission method according to an embodiment of the present invention.

FIG. 5 is a flowchart illustrating a method for transmitting data according to an embodiment of the present invention.

Referring to FIG. 5, in step S110, a BS transmits a request message for requesting feedback data to a UE. The request message may be transmitted on a downlink control channel which can be called as a physical downlink control channel (PDCCH). The request message may include uplink scheduling information which includes an uplink radio resource assignment to be used to transmit the feedback data and an indicator to indicate transmission of the feedback data.

In step S115, the UE generates the feedback data. The feedback data may include at least one CQI, at least one PMI and one RI. The feedback data may be generated in various form according to a report type. The report type indicates which forms of CQI, PMI and rank is included in the feedback data. The report type may be given by a radio resource control (RRC) message.

Table 1 shows an example of report types for the feedback data.

TABLE 1

| Report Type | Bitmap | RI | Best-M CQI | Average CQI | PMI |
|---|---|---|---|---|---|
| A | comprised | WB | SB | SB | PB |
| B | comprised | WB | SB | WB | PB |
| C | comprised | WB | SB | Open Loop (OL) | PB |
| D | comprised | WB | WB | WB | PB |
| E | comprised | WB | WB | Open Loop (OL) | PB |
| F | comprised | WB | OL | Open Loop (OL) | — |

'Bitmap' indicates which subbands are selected among a plurality of subbands. It means that the bitmap represents the positions of the selected subbands or PMI bands. For example, when 6 subbands are expressed by a bitmap of 6 bits and the first and third subbands are selected, the bitmap may be represented as '101000'. Or, a plurality of control signals may be distinguished using the bitmap. For example, a control signal having a sequence of one RI, two CQIs of best bands, one average CQI of residual bands, and three PMIs of PMI bands is expressed by a bitmap of 7 bits. If a bitmap is given like '0111000', it means that the control signal comprises two CQIs of best bands and one CQI of residual bands. Or, when N best CQIs of M subbands are transmitted or a CQI of the whole band is transmitted in Best-M, a bitmap of null bits may be transmitted.

'RI' may be calculated over the whole band WB and corresponds to the number of useful transmission layer. A CQI is calculated for each transmission layer.

'Best-M CQI', i.e., a CQI for M best bands, and Average CQI may be comprised in the feedback data as a value for a subband or the whole band according to each report type. The best-M CQI may be referred to as best band CQI. One CQI for each subband may be referred to as frequency selective CQI or subband CQI. One CQI over the whole band may be referred to as frequency flat CQI or whole band CQI.

In report type 'A', 'Best-M CQI' is CQIs of M subbands selected by descending power of CQI values of a plurality of subbands or one CQI of M subbands. 'Average CQI' is an average CQI of residual bands. The CQI for M subbands may have differential CQI value with respect to the average CQI.

In report type 'B', 'Best-M CQI' is CQIs of M subbands selected by descending power of CQI values of a plurality of subbands or a CQI of M subbands. 'Average CQI' is an average value CQI of the whole band WB. The CQI for M subbands may have differential CQI value with respect to the average CQI.

In report type 'C', 'Best-M CQI' is CQIs of M subbands selected by descending power of CQI values of a plurality of subbands or a CQI of M subbands. 'Average CQI' is applied to an open loop (OL), which means that a CQI for residual bands is not transmitted. The open loop means transmitting data without considering feedback data.

In report type 'D', 'Best-M CQI' and 'Average CQI' are respectively an average CQI for the whole band. In report type 'E', 'Best-M CQI' is an average CQI for the whole band, and 'Average CQI' is not transmitted or transmitted at further longer periods. In report type 'F', 'Best-M CQI' and 'Average CQI' are not transmitted.

'PMI' is an index of a precoding matrix selected from a codebook. PMI may be selected over a PMI band (PB) and/or the whole band (WB). The PMI band may have granularity equal to or larger than the subband. Granularity of a PMI band may be variously determined according to the report type of the feedback data. A PMI for at least one subband selected from the whole band is referred to as a frequency selective PMI. A PMI for the whole band is referred to as a frequency flat PMI. The feedback data may include multiple PMI which includes the frequency selective PMI and the frequency flat PMI. A CQI for the PMI band is calculated assuming the use of the precoding matrix indicated by the PMI in the PMI band.

It is assumed that granularity of a PMI band can be determined as shown below.

(1) Smallest PMI Band (S-PB)

Granularity of a PMI band is equal to a subband (PB=SB): Granularity of a PMI band may be determined to be equal to each of M subbands for CQI.

(2) Middle PMI Band (M-PB)

Granularity of a PMI band is an integer number of times larger than a subband (SB<PB<WB): (a) Granularity of a PMI band may be determined to be a size of M consecutive subbands for CQI. (b) M subbands may be determined as a PMI band, when an average CQI of M subbands is transmitted. (c) (N-M) non-selected subbands out of N subbands may be determined as a PMI band.

(3) Largest PMI Band (L-PB)

Granularity of a PMI band is equal to the whole band (PB=WB): Granularity of a PMI band may be determined to be equal to the whole band.

Granularity of a PMI band according to a report type is described based on the granularities of a PMI band S-PB, M-PB, and L-PB described above.

In step S120, the UE transmits the feedback data to the BS. The feedback data may be transmitted on a physical uplink control channel (PUCCH) or physical uplink shared channel (PUSCH). The PUCCH or PUSCH may be allocated to the uplink radio resource assignment in the request message. When feedback data includes one or two of a CQI, a PMI and a RI, the feedback data may be transmitted on the PUCCH. On the contrary, when feedback data includes a CQI, a PMI and a RI, the feedback data may be transmitted on the PUSCH due to limited capacity of the PUCCH.

In step S130, the BS transmits an acknowledgement message to the UE. The acknowledgement message indicates which PMI or RI is used to transmit downlink data. The acknowledgement message may indicate a precoding matrix which is used to precode the downlink data. For example, when 1 bit of the acknowledgement message is used, '1' means that the reported PMI is used and '0' means that the reported PMI is not used. When the BS determines not to use the reported PMI, the BS may further inform the UE of which PMI is used.

In step S140, the BS transmits downlink data 5140. By using the feedback data, the BS can perform efficient downlink scheduling. The feedback data may flexibly be generated as various report types according to assigned radio resource.

Hereinafter, periodic transmission of feedback data is disclosed.

The feedback data may be periodically transmitted according to a transmission period. The transmission period can be indicated by the BS or previously determined between the BS and the UE.

Table 2 shows an example of transmission periods of the feedback data.

TABLE 2

| | Transmission period | | | | | | | | |
|---|---|---|---|---|---|---|---|---|---|
| | 1 | 2 | 3 | 4 | 5 | 6 | 7 | 8 | 9 |
| RI Bitmap PMI CQI | RI Bitmap PMI CQI | CQI | Bitmap PMI CQI | CQI | Bitmap PMI CQI | CQI | Bitmap PMI CQI | CQI | RI Bitmap PMI CQI |

When the report type of a control signal is 'A', granularity of a PMI band for a subband CQI may be at least one of S-PB, M-PB and M-PB. Granularity of a PMI band for an average CQI of residual bands RBs may be M-PB.

When the report type of a control signal is 'B', granularity of a PMI band for a subband CQI may be at least one of S-PB, M-PB and M-PB. Granularity of a PMI band for an average CQI of the whole band may be M-PB or L-PB. In addition, when the number of selected bands M is equal to the number of all subbands N, granularity of a PMI band for a subband CQI may be S-PB, and granularity of a PMI band for an average CQI of the whole band may be L-PB.

When the report type of a control signal is C of table 1, granularity of a PMI band for a subband CQI may be S-PB, M-PB, or M-PB, and granularity of a PMI band for the whole band may be M-PB or L-PB.

When the report type of a control signal is 'D' or 'E' of table 1, granularity of a PMI band for an average CQI of the whole band may be L-PB.

The type of a control signal comprised in the feedback data is merely an example and not a limit. For example, 'PMI' may be given as a value for a subband or the whole band, and accordingly, the type of a control signal comprised in the feedback data may be variously modified.

At the first, fifth, and ninth transmission periods, CQI/PMI may be transmitted as described below on PUSCH or PUCCH according to report type 'A', 'B', 'C', or 'E' shown in table 1.

In report type 'B', if the number of all subbands N is equal to the number of selected subbands M (N=M), the bitmap may be transmitted as null bits, and individual M CQI/PMI for each of M subbands and an average CQI for the whole band may be transmitted.

If N>M in report type 'A' or 'B', a bitmap, Best-M CQI/PMI, and an average CQI/PMI may be transmitted. The Best-M CQI/PMI means CQI/PMIs for each of M subbands or an average CQI/PMI of M subbands. The average CQI/PMI means (a) an average CQI/PMI for the whole band, (b) an average CQI for the whole band and a PMI for the residual bands, or (c) an average CQI/PMI for the residual bands.

If N>M in report type 'C', Best-M CQI/PMI may be transmitted. The Best-M CQI/PMI means CQI/PMIs for each of M subbands or an average CQI/PMI for M subbands.

In report type 'E', CQI/PMI for the whole band may be transmitted.

All of RI, bitmap, PMI, and CQI are transmitted at the first transmission period. Thereafter, all of the RI, bitmap, PMI and CQI are transmitted at the ninth transmission period. The first and ninth transmission periods are transmission periods for transmitting all kinds of feedback information to be transmitted by the UE. When feedback data is large as shown at the first and ninth transmission periods, the feedback data may be transmitted on the PUSCH that can accommodate a large amount of information. Or, feedback data comprising all of the RI, bitmap, PMI and CQI may be transmitted on a specific control channel that is allocated for feedback data having a variable size.

A RI may be transmitted at a transmission period that is eight times as long as a transmission period of CQI. Bitmap and PMI may be transmitted at a transmission period that is twice as long as a transmission period of CQI. A transmission method of CQI may be changed, and a bitmap may be expressed differently according to the transmission method of CQI. A PMI transmitted by the UE may be a frequency selective PMI and/or a frequency flat PMI. Since the PMI is obtained in association with the CQI, even when the UE transmits a frequency flat PMI, the PMI may be obtained and transmitted as a frequency selective PMI if a frequency selective CQI is calculated thereafter. The frequency selective PMI may be transmitted on an error detection channel, and the frequency flat PMI may be transmitted on an error detection channel or a control channel.

A CQI is transmitted at every transmission time period. At this point, a CQI for best bands and an average CQI of residual bands may be transmitted at the first transmission period. Or, a CQI for the best bands and an average CQI of the whole band may be transmitted at the first transmission period. The CQI is recalculated based on the previously reported RI, bitmap, and PMI. That is, CQI is newly calculated and transmitted at every transmission period. After the first transmission period of CQI, CQI may be transmitted as a newly calculated CQI value or a differential value from the CQI transmitted at the first or immediately previous transmission period.

At a transmission period when all kinds of feedback information not to be transmitted (such as second to eighth transmission periods), feedback data may be transmitted on a uplink control channel (i.e. PUCCH). For example, when only CQI is transmitted, the CQI may be transmitted on the uplink control channel.

Table 3 shows another example of transmission periods of feedback data.

At the first, fifth, and ninth transmission periods, CQI/PMI may be transmitted on PUCCH according on any one of report types 'A', 'B', and 'C'.

If the number of all subbands N is equal to the number of selected subbands M (N=M), the bitmap may be transmitted as null bits, and CQI/PMI for each of M subbands (individual M CQI/PMI) and an average CQI for the whole band may be transmitted.

If N>M, a bitmap, Best-M CQI/PMI, and an average CQI/PMI may be transmitted. The Best-M CQI/PMI means M CQI/PMIs for each of M subbands or an average CQI/PMI of M subbands. The average CQI/PMI means (a) an average CQI/PMI for the whole band, (b) an average CQI for the whole band and a PMI for the residual bands, or (c) an average CQI/PMI for the residual bands.

Feedback data may be transmitted at the first, fifth, and ninth transmission periods and the third and seventh transmission periods in combinations described below. These combinations are merely an example and are not a limit.

(1) Report type 'B' is applied when N=M at the first, fifth, and ninth transmission periods. And CQI/PMI of the whole band may be applied at the third and seventh transmission periods. That is, M CQI/PMIs and an average CQI of the whole band may be transmitted at the first, fifth, and ninth transmission periods, and CQI/PMI for the whole band may be transmitted at the third and seventh transmission periods.

(2) Report type 'A' or 'B' is applied when N>M at the first, fifth, and ninth transmission periods, and Best-M CQI/PMI recalculated based on the bitmap information used in the first, fifth, and ninth transmission periods may be transmitted at the third and seventh transmission periods.

(3) Any one of report types 'A', 'B', and 'C' may be applied when N>M at the first, fifth, and ninth transmission periods, and CQI/PMI for the whole band may be transmitted at the third and seventh transmission periods. By applying report type 'A' or 'B', an average CQI for the whole band or residual bands, and a PMI for the residual bands are transmitted as an average CQI/PMI at the first, fifth, and ninth transmission periods. And CQI/PMI for the whole band may be transmitted at the third and seventh transmission periods. By applying report type 'C', an average CQI/PMI for the whole band or residual bands is not transmitted at the first, fifth, and ninth

TABLE 3

| | Transmission period | | | | | | | | |
|---|---|---|---|---|---|---|---|---|---|
| | 1 | 2 | 3 | 4 | 5 | 6 | 7 | 8 | 9 |
| RI | RI | | | | | | | | RI |
| Bitmap | Bitmap | | | | Bitmap | | | | Bitmap |
| PMI | PMI | | PMI | | PMI | | PMI | | PMI |
| CQI | CQI | CQI | CQI | CQI | CQI | CQI | CQI | CQI | CQI |

A transmission period of a bitmap may be determined to be longer than a transmission period of PMI in the feedback data. Comparing the transmission periods with one another, it is that CQI<PMI<Bitmap<RI.

CQI/PMI may be transmitted at the third and seventh transmission period on the PUSCH or PUCCH as described below. By applying the bitmap of the previous transmission period, CQI/PMIs for M subbands (M CQI/PMI) are transmitted on PUSCH, and an average CQI/PMI for M subbands may be transmitted on PUSCH or PUCCH. CQI/PMI for the whole band may be transmitted on PUCCH.

transmission periods, and an average CQI/PMI may be transmitted only at the third and seventh transmission periods.

At the transmission periods when PMI and CQI are transmitted (the third and seventh transmission periods), the PMI and CQI are recalculated assuming that information on the RI and bitmap of the first transmission period is not changed. By reducing transmission of the RI and bitmap that is not changed frequently and transmitting only PMI and CQI that is changed frequently, overhead of an uplink channel caused by transmission of feedback data is reduced. An average CQI for best bands and a PMI applied to the best bands may be transmitted on a channel for transmitting PMI and CQI. Or, at transmission periods for transmitting PMI or CQI, between transmission periods at which all kinds of feedback information are transmitted (the first and ninth transmission periods), frequency flat PMI and frequency flat CQI may be transmitted. When the frequency flat PMI and frequency flat CQI are calculated and transmitted, an appropriate rank may be determined and transmitted together. The rank may be additional information needed for BS's scheduling.

Table 4 shows still another example of transmission periods of feedback data.

TABLE 4

| | Tranmission period | | | | | | | | |
|---|---|---|---|---|---|---|---|---|---|
| | 1 | 2 | 3 | 4 | 5 | 6 | 7 | 8 | 9 |
| RI | RI | | | | | | | | RI |
| Bitmap | Bitmap | | Bitmap | | Bitmap | | Bitmap | | Bitmap |
| PMI | PMI | | | | PMI | | | | PMI |
| CQI | CQI | CQI | CQI | CQI | CQI | CQI | CQI | CQI | CQI |

A transmission period of PMI may be determined to be longer than a transmission period of a bitmap in the feedback data. Comparing the transmission periods with one another, it is that CQI<Bitmap<PMI<RI.

CQI/PMI may be transmitted at the third and seventh transmission periods on PUSCH or PUCCH as described below. CQI for a subband that uses PMI of the previous transmission period may be transmitted as M CQI for each of M subbands on PUSCH together with a bitmap. A bitmap and an average CQI of M subbands may be transmitted on PUCCH.

CQI/PMIs of the first, fifth, and ninth transmission periods may be transmitted on PUSCH or PUCCH according to any one of report types 'A', 'B', and 'E'.

If N>M, (a) a bitmap, Best-M CQI, an average CQI for the whole band or residual bands, and a PMI for the whole band may be transmitted on PUSCH. Or, (b) a bitmap, an average CQI of M subbands, an average CQI for the whole band or the residual bands, and a PMI for the whole band may be transmitted on PUSCH or PUCCH. Or, (c) a bitmap, Best-M CQI, an average CQI for the whole band or the residual bands, and a PMI for a PMI band may be transmitted on PUSCH. Or, (d) a bitmap, an average CQI of M subbands, an average CQI for the whole band or the residual bands, and a PMI for a PMI band may be transmitted on PUSCH or PUCCH. Granularity of a PMI band for transmitting PMI may be equal to or larger than a subband for transmitting CQI, and all PMIs for respective PMI bands of the whole band to be reported may be transmitted at the first, fifth, and ninth transmission periods.

In report type 'E', a bitmap is transmitted as null bits, and CQI/PMI for the whole band may be transmitted on PUCCH.

Control signals may be transmitted at the first, fifth, and ninth transmission periods and the third and seventh transmission periods in combinations described below. These combinations are merely an example and not a limit.

(1) When report type 'D' is applied at the first, fifth, and ninth transmission periods, CQI may be calculated and transmitted at the third and seventh transmission periods based on the PMI for the whole band calculated at the first and fifth transmission period.

(2) When report type 'A' or 'B' is applied at the first, fifth, and ninth transmission periods, CQI may be calculated and transmitted at the third and seventh transmission periods based on the PMI for a PMI band or the whole band calculated at the first and fifth transmission period.

Transmission periods of feedback data as shown in tables 2 to 4 are merely an example. A RI, a PMI and a CQI may be separately transmitted. For example, a RI is transmitted at first transmission period, both a CQI and a PMI is transmitted at second transmission period and a CQI is transmitted at the third transmission period.

Since a CQI is most frequently transmitted, a CQI can be calculated on a CQI band which is a part of a whole band. After the whole band is divided into a plurality CQI band, one CQI for the selected subbands within the CQI band is transmitted at each transmission period.

Figure 6:
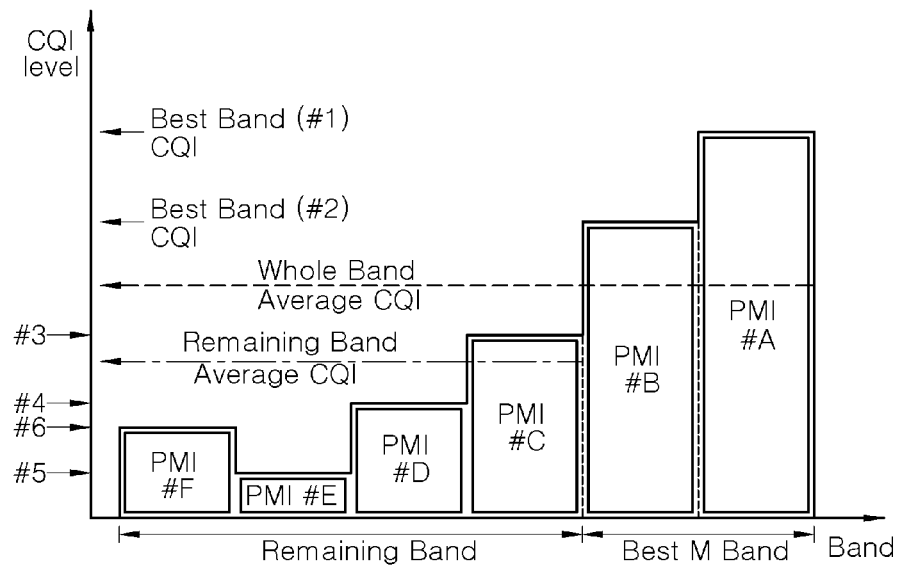
FIG. 6 shows a method for transmitting PMI according to an embodiment of the present invention.

FIG. 6 shows a method for transmitting PMI according to an embodiment of the present invention.

Referring to FIG. 6, PMIs PMI#A and PMI#B of respective best bands #1 and #2 having high CQI levels and PMIs PMI#C to PMI#F of respective residual bands #3 to #5 are transmitted. That is, frequency selective PMIs for all subbands are transmitted. Although data throughput may be increased, uplink overhead is greatly increased. When a PMI is expressed with four bits, a radio resource of 24 bits is used to transmit six PMIs.

Figure 7:
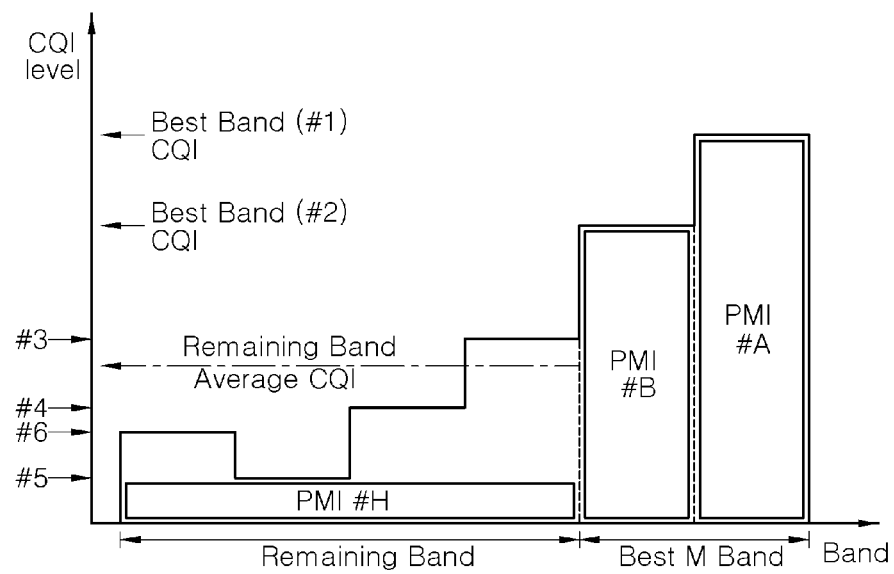
FIG. 7 shows a method for transmitting PMI according to another embodiment of the present invention.

FIG. 7 shows a method for transmitting PMI according to another embodiment of the present invention.

Referring to FIG. 7, PMIs PMI#A and PMI#B of respective best bands #1 and #2 having high CQI levels and one PMI PMI#H for residual bands #3 to #5 are transmitted. That is, frequency selective PMIs for the best bands are transmitted, and a frequency flat PMI for the residual bands is transmitted. Uplink overhead may be reduced, and data throughput may be enhanced since PMIs of the best bands may be transmitted. When a PMI is expressed with four bits, a radio resource of 12 bits is used to transmit the PMIs.

Figure 8:
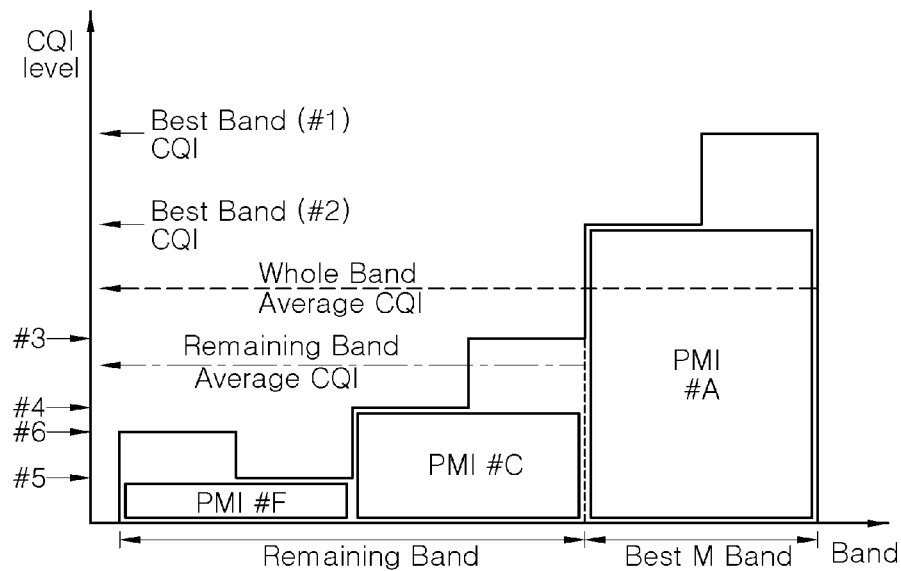
FIG. 8 shows a method for transmitting PMI according to still another embodiment of the present invention.

FIG. 8 shows a method for transmitting PMI according to still another embodiment of the present invention.

Referring to FIG. 8, granularity of a PMI band may be set to be larger than a subband. Here, since the granularity of a PMI band is twice as large as a subband, one PMI PMI#A is transmitted for best bands #1 and #2 having high CQI levels, and two PMIs PMI#C and PMI#F are transmitted for the residual bands #3 to #5. Even though all frequency selective PMIs are transmitted, uplink overhead may be reduced by setting the granularity of a PMI band to be larger than a subband. When a PMI is expressed with four bits, a radio resource of 12 bits is used to transmit the PMIs.

Figure 9:
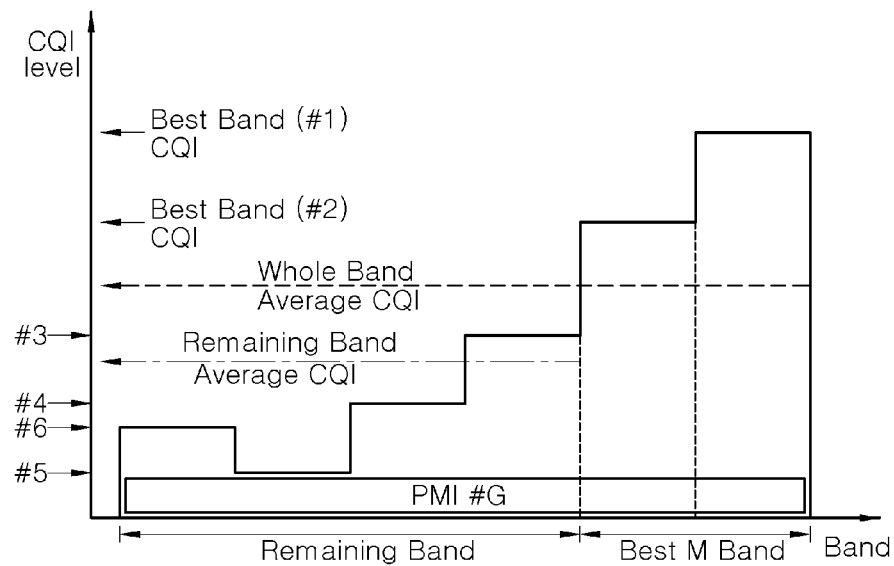
FIG. 9 shows a method for transmitting PMI according to still another embodiment of the present invention.

FIG. 9 shows a method for transmitting PMI according to still another embodiment of the present invention.

Referring to FIG. 9, one PMI is transmitted for the whole band. That is, one frequency flat PMI is transmitted. Although uplink overhead is decreased, data throughput may be degraded.

Although a variety of methods for transmitting PMI in the Best-M method is described, they are merely examples. The number of subbands and best bands may be variously modified, and the number and granularity of PMI bands may also be variously modified. The PMI may be transmitted in a variety of methods such as transmitting a frequency flat PMI for best bands and a frequency flat PMI for the whole band, or transmitting PMI for only some of best bands among a plurality best bands.

Figure 10:
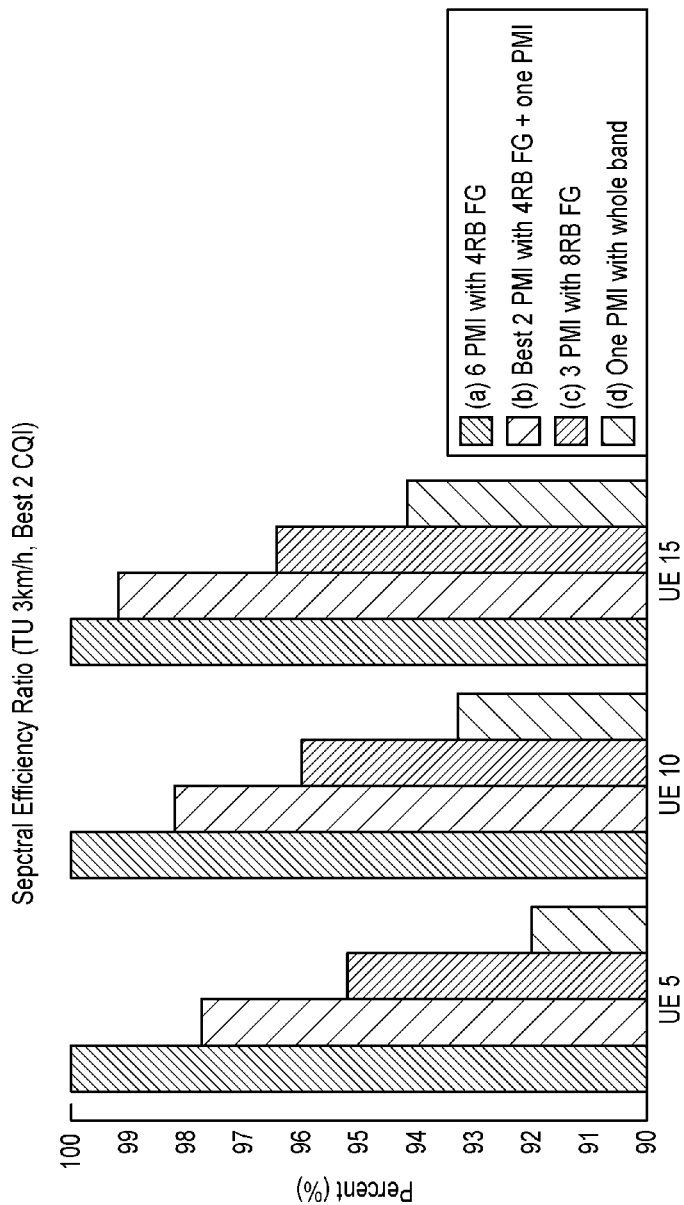
FIG. 10 is graphs showing system efficiency ratios according to transmission of uplink PMI.
Figure 11:
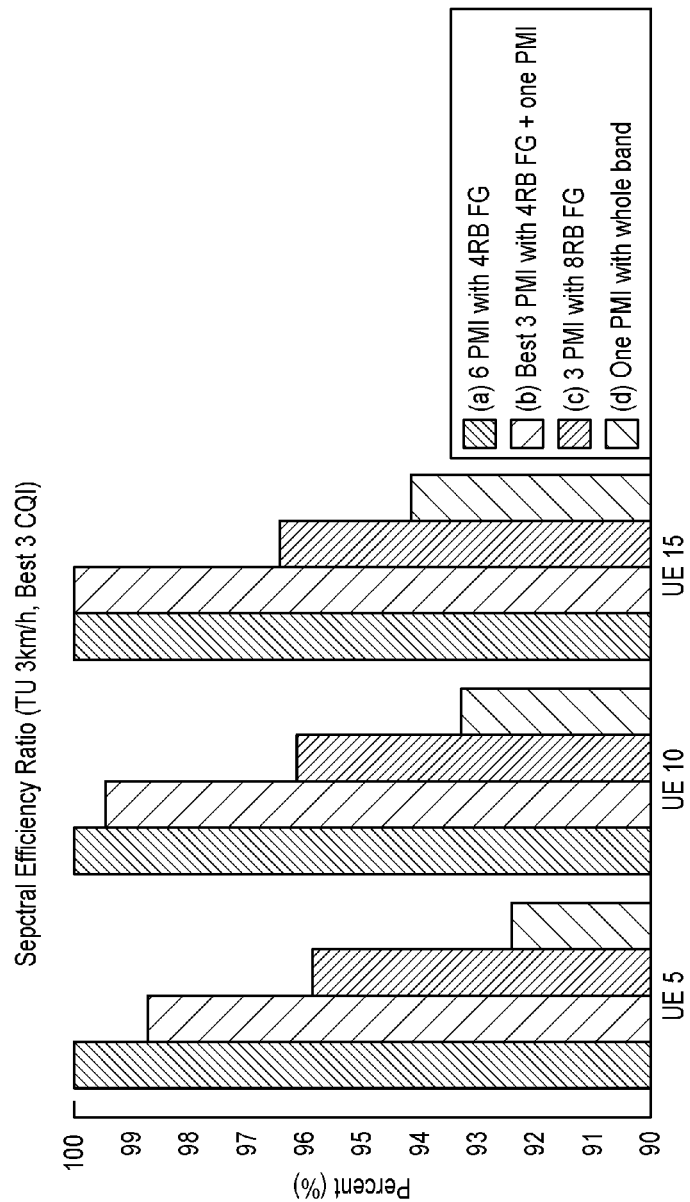
FIG. 11 is graphs showing system efficiency ratios according to transmission of uplink PMI.

FIGS. 10 and 11 are graphs showing system efficiency ratios according to transmission of uplink PMI. FIG. 10 shows a case where two best bands are selected (M=2 in the Best-M method), and FIG. 11 shows a case where three best bands are selected (M=3 in the Best-M method).

Referring to FIGS. 10 and 11, it is assumed that the whole band comprises six subbands, and frequency granularity (FG) of a subband is four resource blocks (RBs). (a) shows a case where PMIs for all subbands are transmitted. (b) shows a case where PMIs of best bands and a PMI for residual bands are transmitted. (c) shows a case where granularity of a PMI band is determined to be eight resource blocks and PMIs for respective PMI bands are transmitted. (d) shows a case where a PMI for the whole band is transmitted.

It is understood that if PMIs for best bands are transmitted in the Best-M method, overhead caused by transmission of the PMIs may be reduced due to low system performance loss.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method for communicating with a base station (BS) in a multiple antenna system, the method performed by a user equipment (UE) and comprising:
receiving a request message for requesting feedback data;
generating the feedback data that includes a precoding matrix indicator (PMI) indicating a first precoding matrix in response of the request message;
transmitting the generated feedback data;
receiving an acknowledgement (ACK) message for the feedback data;
receiving downlink data multiplied by a second precoding matrix; and
decoding the downlink data based on the ACK message,
wherein the first precoding matrix and the second precoding matrix are included in a codebook,
wherein the ACK message indicates whether the second precoding matrix is identical to the first precoding matrix, and
wherein the ACK message has a smaller bit size than a bit size required for indicating the second precoding matrix in the codebook.

2. The method of claim 1, wherein
the ACK message indicates that the second precoding matrix is identical to the first precoding matrix when the value of the ACK message is 1.

3. The method of claim 1, wherein the feedback data further includes a channel quality indicator (CQI) and a rank indicator (RI).

4. The method of claim 3, further comprising:
receiving report type information indicating which forms of the CQI, the PMI and the RI are included in the feedback data.

5. The method of claim 4, wherein the report type information is received via a radio resource control message.

6. The method of claim 4, wherein the feedback data is transmitted via a data channel.

7. The method of claim 1, wherein the feedback data is transmitted via a control channel when the feedback data further includes at least a channel quality indicator (CQI) or a rank indicator (RI).

* * * * *